Figure 1:
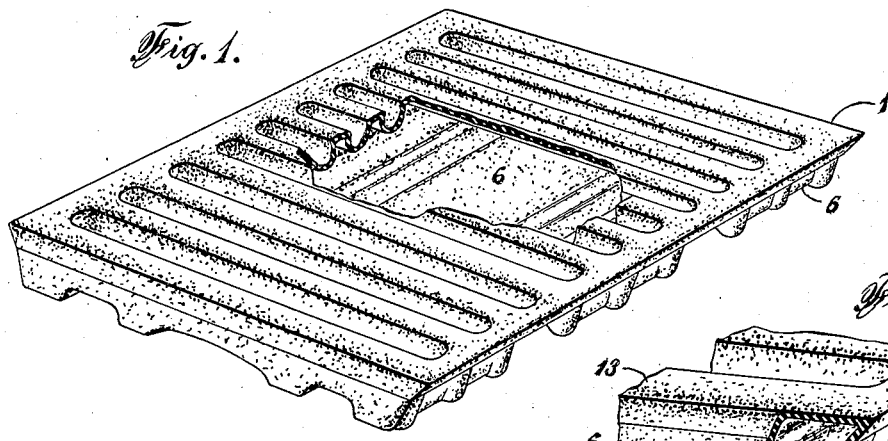

Oct. 18, 1938.　　　R. W. SAMPSON　　　2,133,833

METHOD OF MAKING RUBBER ARTICLES

Filed Sept. 23, 1936　　　2 Sheets-Sheet 1

INVENTOR,
Robert W. Sampson.
BY
Andrew Wilson,
ATTORNEY.

Oct. 18, 1938.     R. W. SAMPSON     2,133,833
METHOD OF MAKING RUBBER ARTICLES
Filed Sept. 23, 1936     2 Sheets-Sheet 2
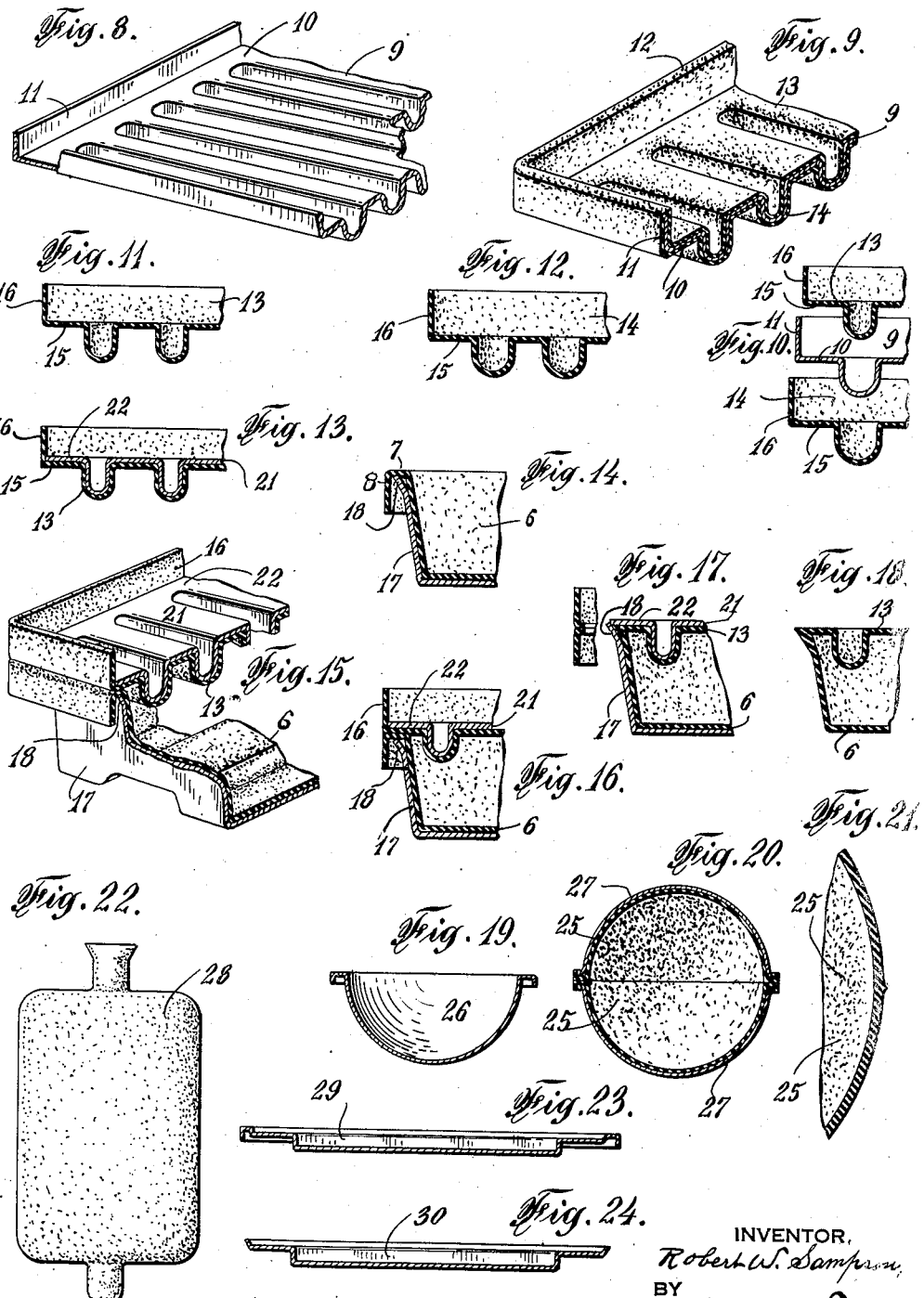

Patented Oct. 18, 1938

2,133,833

UNITED STATES PATENT OFFICE 2,133,833

METHOD OF MAKING RUBBER ARTICLES

Robert W. Sampson, New York, N. Y., assignor to Sampson Rubber Products Corporation, Detroit, Mich., a corporation of Delaware Application September 23, 1936, Serial No. 102,065

8 Claims. (Cl. 18—59)

My invention relates to the manufacture of rubber articles from latex, and is particularly applicable to closed hollow, or substantially hollow articles from which interior molds may not be readily removable.

It is customary in the manufacture of rubber articles from latex to prepare a mold having the desired form, and, by repeated dippings into the latex, to cover it with the desired thickness of uncured rubber, cure the rubber and detach it from the mold. But this method is inapplicable for the formation of closed, or substantially closed articles of rubber, because the mold can not be satisfactorily removed from the inside of the article after curing.

Consequently it has been proposed to use separate dipping forms, for instance two, which will each produce part of the desired form, strip the molded latex from each form, transfer the molded sheets to the inside of curing forms, and then to bring the molded sheets together edge to edge, apply pressure to the edges, and cure the rubber while so held.

In this operation it has been proposed to form laterally projecting, flat flanges surrounding the molded portions, which, when the sheets are assembled, will register against each other, and will to some extent coalesce when pressure is applied as by the curing molds.

This method, however, has proved to be unsatisfactory in practice, because the flanges are apt to slip relative to each other causing a deformed or imperfect coalescence, not insuring a perfect juncture of the two sheets.

Attempts have been made to remedy this by widening the flanges. But this has not proved to be satisfactory; because the flanges will still slip more or less, making the line of true coalescence uncertain; while the danger of the formation of air pockets between the flanges is increased as they are widened.

Furthermore these projecting flanges on a completed article are unsightly; and, in some cases may interfere with the proper, desired use of the finished article; particularly as they can not be readily cut away or removed after the rubber is cured, and if so cut away the cutting may open an air pocket or a spot of defective coalescence, and ruin the cured article.

The objects of my present invention are to overcome these defects in the joining of the separate sheets, molded from latex; to insure a perfect juncture and coalescence of the margins of the sheets; to eliminate any objectionably protruding flange or rim; to give a neat and unobjectionable finish at the line of juncture of the sheets; and to obtain the other advantages hereinafter pointed out.

Figure 2:
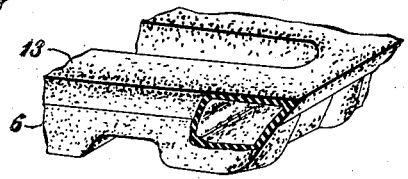
Figure 3:
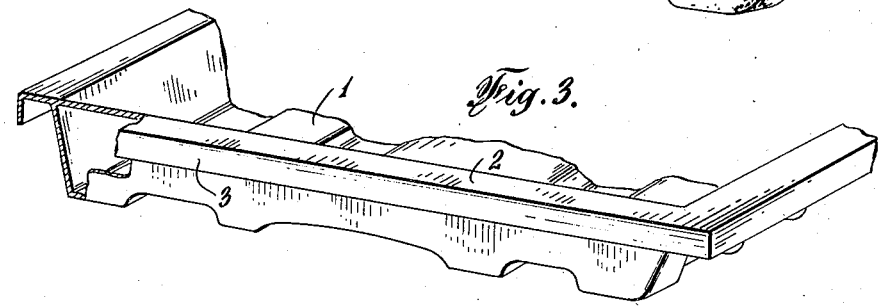
Figure 4:
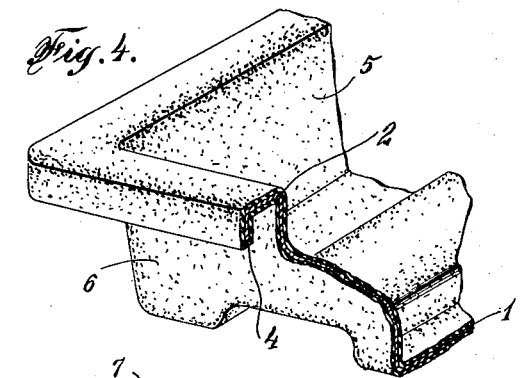
Figure 6:
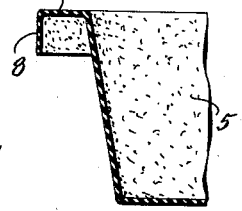
Figure 7:
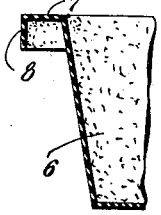
Figure 5:
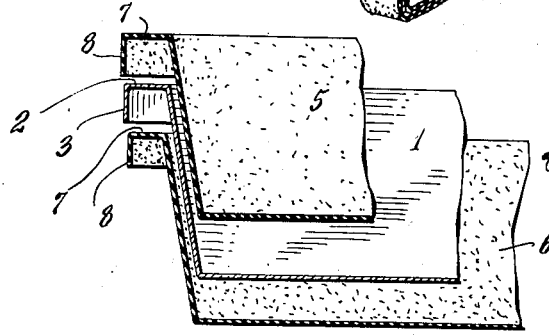

In the drawings, Fig. 1 is a perspective view, partially broken away centrally, of a pneumatic cushion illustrating an article which may be produced by my improved method; Fig. 2 is a fragmentary, perspective view, partly in section, of one corner of the cushion shown in Fig. 1; Fig. 3 is a perspective view partly in section of one end of a mold for forming the bottom of the cushion, Figs. 2 and 3 being on an enlarged scale as compared with Fig. 1; Fig. 4 is a perspective view partly in section of one corner of a mold completely covered with latex rubber; Fig. 5 is a sectional view of one corner of the mold showing the latex sheets separated therefrom; Figs. 6 and 7 are fragmentary views of separated corners of the latex sheets; Fig. 8 is a perspective view, partly in section, of a mold for forming the top or otherwise of the cushion, on a scale similar to Fig. 1; Fig. 9 is a perspective view of a corner of the mold of Fig. 8, covered with latex rubber; Fig. 10 shows in vertical section a corner of the mold of Fig. 8, and the rubber sheets separated therefrom; Figs. 11 and 12 are similar views of portions of the separated rubber sheets; Figs. 9, 10, 11 and 12 are on a slightly enlarged scale as compared with Fig. 8; Fig. 13 is a fragmentary view of a corner of a top curing mold with the corresponding rubber sheet applied thereupon; Fig. 14 is a corresponding view of a corner of the lower curing mold and its appropriate rubber sheet; Fig. 15 is a perspective view of corners of the upper and lower curing molds with their rubber sheets applied to them; Fig. 16 is a sectional elevation of corners of the upper and lower curing molds and their applied rubber sheets, ready for marginal coalescence; Fig. 17 is a similar view showing the curing molds closed and the excess rubber flanges cut off; Fig. 18 shows the rubber sheets of Fig. 17 united and detached from the curing molds; Fig. 19 is a sectional view of a mold for forming one half of a rubber ball; Fig. 20 is a sectional view of two rubber sheets molded with the mold of Fig. 19, and assembled and held within two curing molds; Fig. 21 is a view on an enlarged scale of a section of the completed rubber ball, showing the fillet at the point of juncture of the halves; Fig. 22 is a plan view on a reduced scale of a hot water bag; Fig. 23 is a longitudinal sectional view of a forming mold for the same; and Fig. 24 is a similar view of a curing mold for the same. Figs. 2 to 7 and 14 to 18, inclusive are on an enlarged scale as compared with Fig. 1.

The lower, typical forming mold 1 is shown as provided with a marginal flange 2 with a downwardly turned lip 3 surrounding the mold. This mold is preferably formed of sheet metal; and it is adapted to be covered, by repeated dipping in latex, with uncured rubber to the thickness of the particular article to be formed.

When the latex on the mold has set, it is cut, by a rotary cutter or other suitable means, along the edge of the lip 3, as at 4, so that the rubber may be stripped from the opposite sides of the mold, forming two sheets 5 and 6, which may be used interchangeably, and each of which has an outwardly and downwardly extended flange 7 and 8, forming a sort of gutter around the rubber sheet.

The upper forming mold 9 is also provided with a marginal flange 10 having an upturned lip 11, and is coated, similarly to mold 1, with latex, which, when set, is also cut along the top of the upturned lip, as at 12, into inner and outer sheets 13, 14, also having marginal flange elements 15, 16, which are stripped off the mold. These sheets also are interchangeable.

A sheet 5 or 6 is then smoothed into place within a curing mold 17, which differs from the mold 1 particularly in that instead of an approximately flat marginal flange with a downwardly turned lip, its edge is flared outwardly, slightly, as at 18, so as to lie within the gutter formed by the flange 7, 8 around the molded sheet of rubber.

Similarly a sheet 13 or 14 is placed upon an upper curing mold 21, provided with a marginal flange 22, adapted to lie inside of the marginal lip 16 so as to prevent the edge of the rubber from slipping inward toward the curing mold.

The curing molds, with their inclosed rubber sheets, are then assembled as shown in Fig. 15, so that their respective flanges 7 and 15 register opposite each other, and the curing forms are then clamped or forced together so that the edge 18 of curing mold 17 cuts through the rubber and to the flange 22, thus crowding together the uncured rubber of the margins 7 and 15, causing the flanges to coalesce, making a particularly tight joint below the edge 18, and severing the surplus rubber outside of the edge 18, but, if desired, leaving a slight projecting rib, band or fillet outside of the line of juncture of the sheets.

The rubber is then cured in the usual manner within the molds, which are afterwards removed.

It will be readily understood by those familiar with the art, that a portion of a gas producing element may be inclosed inside of the rubber sheets before they are closed against each other, so as to expand under heat and to press the rubber closely into place within the curing molds; or compressed air may be employed to distend the article within the molds, in ways understood in the art.

From this description it will be seen that the configuration of the molded sheets of uncured rubber is such that when they are assembled in and between the curing molds they can not slip or shift marginally, but will be firmly held in correct registration within the mold sections, and their margins positively and accurately consolidated and trimmed and finished in a neat and efficient manner without danger of inaccurate joining, air holes or other defects.

The particular function of the upturned lips upon the sheets of molded rubber is, as has been seen, to act as stops, preventing the slipping of the sheets inwardly into the molds or away from proper registration below the cutting edge of the curing mold.

Hence, it will be understood that it is not essential that the flanges should have lips disposed at right angles to their planes as illustrated, for the lips may be of other than rectilinear forms, for instance beads, thickened portions, or enlargements which will prevent the flanges from slipping out of position in the molds.

Furthermore, the forms of articles illustrated in the drawings as embodying my improvements are selected as typical forms; and as in no sense exclusives forms. For it is obvious that such forms may be adapted as are appropriate for the particular article desired and which may be advantageously made by my method.

Thus in Figs. 19, 20 and 21 I have shown the application of my improvements in the production of a round ball, both halves 25, 25 of which may be molded in the forming mold 26, and joined between duplicate curing molds 27, 27, the lips of which cut against each other; and in Fig. 22 I have shown a conventional hot water bottle 28, which may be made, conveniently, by the use of the forming mold 29, and a pair of curing molds 30.

By flaring the cutting edges of the curing molds outwardly their action is made to thicken internally the angular edge formed by them on the molded article, if desired. This is peculiarly advantageous in the case of such an article as the cushion illustrated in Fig. 1, et seq., as it stiffens the edge and gives it a desirable form for aligning and supporting applied upholstery. And this thickened or stiffened edge formation may be used under other conditions as circumstances indicate.

As the forming molds may be made of sheet metal stampings, the difference in size of the sheets of uncured rubber stripped from the opposite sides of the mold is so little as to be unimportant, and the sheets may be used interchangeably. The latex having direct contact with the form on which it is deposited will have a smoother and more even surface than the exterior layer of repeated dippings. But when sections are relatively reversed and are assembled and held in position within a curing mold having a smooth interior surface the process of curing will give the hollow article formed by the sections a uniformly smooth surface desirable for a finished article, irrespective of which surfaces of the sections lay against the dipping mold.

For clearness, the apparent difference of size has been somewhat exaggerated in the drawings. In practice it is unimportant. When sheet like sections are formed from latex rubber, as by dipping a mold into the latex, the uncured rubber as it dries or sets will retain the shape of the mold upon which it is deposited, when stripped from the mold. It may therefore be reassembled on another similar form, without distortion, and if the section is provided with overhanging or flanged edges, those edges will assume their proper positions upon the substituted form. In this respect the latex formed sections differ from flat, calendered sheets of uncured rubber. Because if such calendered sheets are pressed into definite forms, and released, they will not retain, with any accuracy, their pressed conformation, because the rubber will stretch out and tend to resume its original position. Consequently such calendered sheets are not adapted for carrying out the method of my invention.

I wish it to be clearly understood that details of my improvements may be modified, as by the use of practical equivalents, without departing from the scope of my invention as claimed.

Having thus described my invention what I claim and desire to secure by Letters Patent of the United States is:—

1. The method of making hollow articles from latex rubber consisting in forming of such rubber in one piece a pair of marginally joined similar sections, severing them along the line of juncture of their margins; forming a complementary pair of similarly joined sections and severing them along the line of juncture of their margins, assembling a section from each pair in marginal contact, positively holding such margins against displacement inwardly, joining and consolidating and trimming such margins, curing the rubber, and assembling, and uniting and curing the other two sections in a similar manner.

2. The method of making a hollow article from latex rubber, consisting in the forming, in the initial depositing of the latex in a definite form, of two complementary sections of such an article of such rubber, each provided with a marginal flange having an angularly disposed edge, holding the sections in their original shapes, assembling the sections with their marginal flanges in contact, to form a closed, hollow space between them, positively gripping such margins exteriorly within their angularly disposed edges and holding such margins against inward displacement, joining and consolidating such margins by pressure, while so held, and then curing the rubber.

3. The method of making a hollow article from latex rubber, consisting in the forming, in the initial depositing of the latex in a definite form, of two complementary sections of such an article of such rubber, each provided with a marginal flange having an angularly disposed edge, holding the sections in their original shapes, assembling the sections with their margins in contact to form a closed, hollow space between them, positively gripping such margins exteriorly and holding such margins within their angularly disposed edges against inward displacement, joining and consolidating and trimming such margins by pressure, while so held, in the form of an outwardly beveled fillet and then curing the rubber.

4. The method of making a hollow article from latex rubber, consisting in the forming, in the initial depositing of the latex in a definite form, of two complementary sections of such an article of such rubber, each provided with an integral marginal flange having a divergent anti-slipping portion, holding the sections in their original shapes, assembling the sections with their margins in contact to form a closed, hollow space between the sections, positively holding such margins by means of such anti-slipping portions against inward displacement, joining and consolidating such margins by pressure, and then curing the rubber.

5. The method of making a hollow article from latex rubber, consisting in the forming, in the initial depositing of the latex in a definite form, of two complementary sections of such an article of such rubber, each provided with a marginal flange having an angularly disposed lip constituting a marginal anti-slipping element, holding them in their original shapes, assembling them with their marginal flanges in contact to form a closed, hollow space between them inside of the margins, positively holding such margins inside of such angularly disposed lips against inward displacement, joining and consolidating such margins by pressure, while so held, and then curing the rubber.

6. The method of making hollow articles from latex rubber, consisting in the forming, in the initial depositing of the latex in a definite form, of two complementary sections of such an article of such rubber, each provided with a marginal flange having an angularly disposed lip constituting a marginal anti-slipping element, the lips being relatively reversed on the two sections, holding the sections in their original shapes, assembling them with their margins in contact to form a closed, hollow space between them inside of the margins, positively holding such margins, inside of such anti-slipping elements, against inward displacement, joining and consolidating such margins by pressure, while so held, and then curing the rubber.

7. The method of making a hollow article from latex rubber, consisting in the forming in one piece, in the initial depositing of the latex in a definite form, of two complementary sections of such an article, joined at their edges, and both facing in the same direction, each section being provided with a marginal flange having an angularly disposed edge, severing the sections along their joined edges, holding the sections in their original shapes, reversing one of them, assembling them with their margins in contact to form a closed, hollow space between the sections inside of their margins, positively holding such margins against inward displacement by means of their angularly disposed edges, joining and consolidating and trimming such margins by pressure, while so held, in the form of an outwardly beveled fillet, and then curing the rubber.

8. The method of making a hollow article from latex rubber consisting in the simultaneous forming, in the initial depositing of the latex in definite form, of two substantially identical sections built up by repeated deposits of the latex one of said sections having the first and succeeding deposits upon its face and the other of said sections having said first and succeeding deposits upon its back, relatively reversing the sections, assembling them edge to edge and then curing the article, the last deposited exterior surface of one of the sections being smoothed and consolidated in the process of curing.

ROBERT W. SAMPSON.